Aug. 1, 1950  W. C. BRAGG  2,516,950
DEVICE FOR THAWING FROZEN WATER PIPES
Filed May 18, 1948

INVENTOR.
WILLIS C. BRAGG,
BY
McMorrow, Berman & Davidson
ATTORNEYS.

Patented Aug. 1, 1950

2,516,950

UNITED STATES PATENT OFFICE 2,516,950

DEVICE FOR THAWING FROZEN WATER PIPES

Willis C. Bragg, Waitsfield, Vt.

Application May 18, 1948, Serial No. 27,665

4 Claims. (Cl. 219—19)

This invention relates to apparatus for thawing frozen water pipes and more particularly to such an electrically heated device as may be introduced into frozen water pipes.

An object of this invention is to provide a relatively simple, inexpensive and easily operated heating device that may be inserted into frozen water pipes for thawing purposes.

Another object is to provide a heating device, for thawing frozen water pipes, in which the heat is supplied electrically.

Another object is to provide a heating device, for thawing frozen water pipes, in which the casing or head of the device is shaped for most effective use.

Another object is to provide such a device and a suitable thrust cable or conduit for the device through which the heating current lines are run.

Still further objects and advantages will become apparent from the following description when considered in conjunction with the accompanying drawings and as more particularly pointed out in the appended claims.

This invention is designed for thawing frozen water pipes where a simple thrust exerted upon a cable or conduit, used to convey a current of electricity to a heating element enclosed in a protective casing as a head on the far end of the conduit, may cause the heated head of the conduit to follow the course of the pipe in which it is inserted and melt away accumulated ice.

The shape of the head, substantially round and pointed, is such as will more rapidly melt and thus permit more advancement through the ice due to the greater surface of the tip of the head contacting the ice than would occur if the tip of the head was flat and of a surface area equal only to its diametrical end face or cross section.

The invention may best be understood by reference to the accompanying drawing, wherein.

Figure 1:
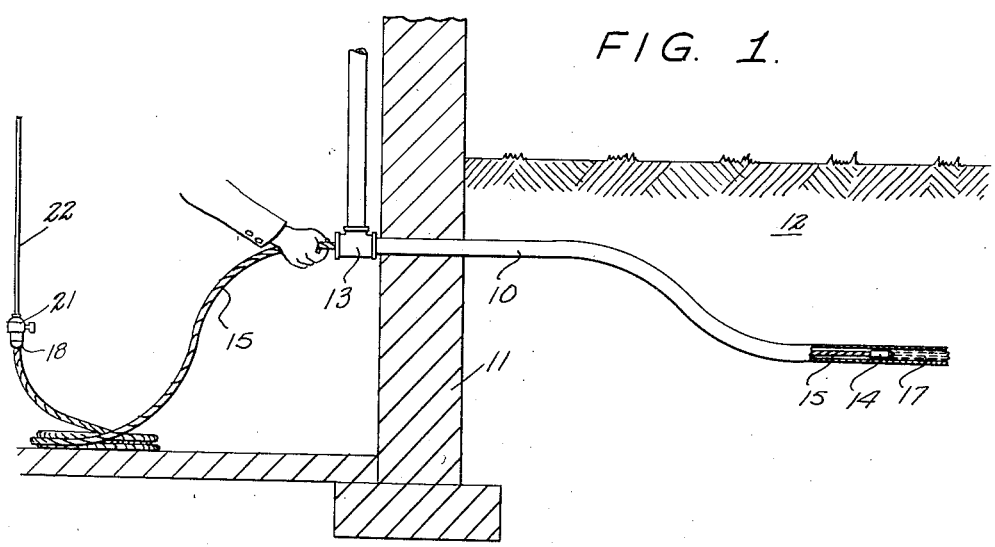
Figure 1 is an elevational view of a building wall and surrounding earth in section showing a frozen water pipe being thawed by means of this device.

In Figure 1 a water pipe 10 is shown passing through a building wall 11 into the earth 12. Inside the building a plug has been removed from the pipe T 13 and the heating device 14, together with its thrust cable or conduit 15, is shown being inserted in the water pipe 10 through the T until it contacts the ice 17.

The inner end of the conduit 15 is provided with an electrical terminal plug 18 connected to the heating element 19 by means of a pair of wires 20 passing through the conduit. Plug 18 is inserted in a convenient outlet 21 of power source line 22.

Figure 2:
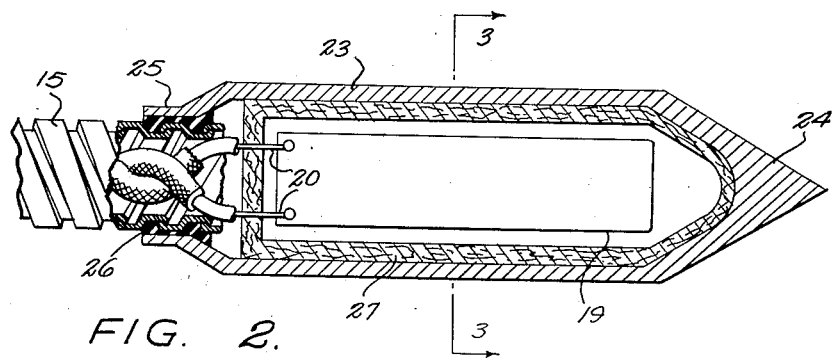
Figure 2 is a sectional side elevation of the heated head.
Figure 3:
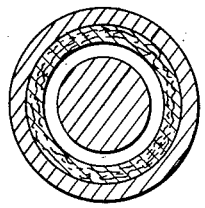
Figure 3 is a sectional end view taken on line 3—3 of Figure 2.

The ice melting head comprises, as shown in Figure 2, a tubular enclosing outer casing 23 substantially pointed at one end to form a tip 24 providing a greater area for contact with the ice 17, than would a flat or rounded diametrical end. The opposite end 25 of the casing 23 is diametrically reduced to form a sleeve and retain an insulating water-proof bushing 26 for securing the head to the end of the flexible conduit 15.

On the inside of casing 23 is provided a heat-conducting electrical insulating and shock-absorbing shell or jacket 27 having apertures at one end through which the conductors 20 pass to the enclosed heating element 19.

The heating element 19 may be of any suitable construction, for example, like those used in electric soldering irons.

Conduit 15 may be of any suitable metal-clad flexible type, filled with a flexible insulating material such as soft rubber in which the electrical conductors 20 are embedded and insulated against moisture and damage.

It will be readily understood that the heated head casing 23 may be easily inserted into a water pipe by removing a suitable pipe connection or portion thereof; that it may be thrust to advance along the pipe by means of the flexible conduit, and that it will thus follow normal contours, curvatures or irregularities of the pipe until accumulated ice therein is melted after which the head may be conveniently withdrawn by means of the conduit.

It will also be understood that the head 23 may be constructed in suitable sizes to operate in different sized pipes, and that the capacity of the heating element 19 may be made suitable for the size of the pipe in which it is to operate.

It is to be understood that various modifications and changes may be made in this invention without departing from the spirit and scope thereof, as set forth in the appended claims.

What is claimed is:

1. A device for thawing frozen water pipes comprising a waterproof flexible conduit comprising helically wound interlocked channel-shaped metallic strips and adapted to be inserted in a water pipe, a head secured to one end of said conduit, an electrical heating element within said head, and a pair of conductors in said conduit connected at one end to said heating elements.

2. A device for thawing frozen water pipes comprising a flexible conduit comprising helically wound interlocked channel-shaped metallic strips, and adapted to be inserted in a water pipe, a head provided with a tip of greater area than the cross section of said head, said head being secured to one end of said conduit, an electrical heating element within said head, and a pair of conductors in said conduit connected at one end to said heating element.

3. A device for thawing frozen water pipes comprising a flexible conduit formed of helically wound interlocked channel-shaped metallic strips and adapted to be inserted in a water pipe, a head secured to one end of said conduit, an electrical heating element within said head, a heat conducting electrical insulating, shock absorbing jacket between said heating element and the inside of said head, and a pair of conductors in said conduit connected at one end to said heating element.

4. A device for thawing frozen water pipes comprising a waterproof flexible conduit formed of helically wound interlocked channel-shaped metallic strips and adapted to be inserted in a water pipe, a head provided with a tip of greater area than the cross section of said head, said head being secured to one end of said conduit and adapted to be heated, an electrical heating element within said head, a heat conducting electrical insulating shock absorbing jacket between said heating element and the inside of said head, and a pair of conductors in said conduit connected at one end to said heating element.

WILLIS C. BRAGG.

REFERENCES CITED

The following references are of record in the file of this patent:

UNITED STATES PATENTS

| Number | Name | Date |
|---|---|---|
| 944,382 | Ross | Dec. 28, 1909 |
| 1,810,164 | Fay et al. | June 16, 1931 |
| 1,927,035 | Hicks | Sept. 19, 1933 |
| 2,075,686 | Wiegand | Mar. 30, 1937 |